United States Patent
Uno et al.

(10) Patent No.: US 9,465,230 B2
(45) Date of Patent: Oct. 11, 2016

(54) LENS HOLDING DEVICE

(71) Applicant: TDK Corporation, Minato-ku, Tokyo (JP)

(72) Inventors: Masaru Uno, Tokyo (JP); Kazutomo Imi, Tokyo (JP); Noriyuki Kawano, Tokyo (JP); Kazuhiko Inoue, Tokyo (JP); Masashi Gotoh, Tokyo (JP); Osamu Ohhata, Tokyo (JP); Shintarou Koike, Tokyo (JP); Yasuhide Yamashita, Tokyo (JP)

(73) Assignee: TDK Corporation, Tokyo (JP)

( * ) Notice: Subject to any disclaimer, the term of this patent is extended or adjusted under 35 U.S.C. 154(b) by 85 days.

(21) Appl. No.: 14/251,378

(22) Filed: Apr. 11, 2014

(65) Prior Publication Data
US 2014/0307319 A1   Oct. 16, 2014

(30) Foreign Application Priority Data
Apr. 11, 2013 (JP) .................................. 2013-083178

(51) Int. Cl.
| G02B 27/64 | (2006.01) |
| G03B 3/10 | (2006.01) |
| G02B 27/08 | (2006.01) |
| H04N 5/232 | (2006.01) |
| G02B 7/08 | (2006.01) |

(52) U.S. Cl.
CPC .............. *G02B 27/646* (2013.01); *G02B 7/08* (2013.01); *G03B 3/10* (2013.01); *G03B 2205/0069* (2013.01); *H04N 5/2328* (2013.01)

(58) Field of Classification Search
CPC .. G03B 3/10; G03B 2205/0069; G03B 5/00; G02B 27/64; G02B 27/646; G02B 7/04; G02B 7/08; G02B 7/09; H04N 5/2328
See application file for complete search history.

(56) References Cited

U.S. PATENT DOCUMENTS

| 5,089,065 A | * | 2/1992 | Hamano | ............... H01F 1/0571 148/302 |
| 5,932,984 A | * | 8/1999 | Murakami | ........... G02B 27/646 318/268 |

(Continued)

FOREIGN PATENT DOCUMENTS

| JP | 2013-24938 A | 4/2011 |
| JP | 2011-128583 A | 6/2011 |

(Continued)

OTHER PUBLICATIONS

Machine translation of JP 2012-173713, retrieved from ESPACENET Aug. 1, 2016.*

(Continued)

*Primary Examiner* — Pascal M Bui Pho
*Assistant Examiner* — Cara Rakowski
(74) *Attorney, Agent, or Firm* — Arent Fox LLP

(57) ABSTRACT

A lens holding unit is held so that it can relatively move with respect to a base part to a direction vertical to an optical axis direction. The lens holding unit has a lens holder, a magnet part, and a spring. The lens holder has a first coil. The magnet part has a first magnet part which includes a first face facing to the first coil and a second magnet part which includes a second face vertical to the first face and constitutes a magnetic domain different from that of the first magnet part. These first magnet part and second magnet part are integrated.

10 Claims, 7 Drawing Sheets

(56) References Cited

U.S. PATENT DOCUMENTS

| | | |
|---|---|---|
| 8,531,534 B2 | 9/2013 | Hu et al. |
| 9,036,260 B2 | 5/2015 | Sugawara |
| 2010/0067353 A1* | 3/2010 | Ochi ................ G02B 7/08 369/112.23 |
| 2011/0001836 A1* | 1/2011 | Chiang ............ G02B 27/646 348/208.99 |
| 2012/0002102 A1 | 1/2012 | Sekimoto |
| 2013/0016427 A1* | 1/2013 | Sugawara ............ G02B 7/08 359/557 |
| 2014/0355118 A1* | 12/2014 | Park ................ G02B 27/646 359/557 |

FOREIGN PATENT DOCUMENTS

| | | |
|---|---|---|
| JP | 2012-032615 A | 2/2012 |
| JP | 2012-032778 A | 2/2012 |
| JP | 2012-058762 A | 3/2012 |
| JP | 2012-173713 A | 9/2012 |
| JP | 2013-24938 A | 2/2013 |

OTHER PUBLICATIONS

Machine translation of JP 2012-032615, retrieved from ESPACENET, Aug. 9, 2016.*

* cited by examiner

LENS HOLDING DEVICE

BACKGROUND OF THE INVENTION

1. Field of the Invention

The present invention relates to a lens holding device suitably used for camera module of the mobile phone, for example.

2. Description of the Related Art

For the lens holding device preferably used for camera modules of the mobile phone or so, those having a function which allows a lens holder to move in the optical axis direction and in the direction vertical to the optical axis direction are proposed in order to carry out focusing movements and blur compensation or so.

Also, as for such a lens holding device, a mechanism that coils attached to a lens holder are in magnetic fields formed by magnets and the lens holder is moved by the electromagnetic force generated in accordance with the electric current value of the coils and a mechanism that the lens holder are supported by springs from both sides of an optical axis direction are proposed (refer to JP Patent Application Laid Open No. 2012-58762).

However, the magnets used for the lens holding device according to the conventional arts had a problem in productivity because the magnets were separated in a circumferential direction due to low flexibility of its shape and the assembling was time-consuming due to the separation.

Also, since the coils are arranged so as to surround an outer circumference of the magnets in the conventional lens holding device, it is difficult to downsize the device in the radial direction of the lens and the conventional device has a problem in miniaturization.

SUMMARY OF THE INVENTION

The present invention is accomplished in view of such situation, and the object is to provide the lens holding device whose shape and structure of the magnets are improved.

In order to achieve the above mentioned object, the lens holding device according to the first aspect of the present invention comprises;

a base part and a lens holding unit held so as to move relatively with respect to the base part to a direction vertical to an optical axis direction; wherein the lens holding unit comprises a lens holder, a magnet part, and a spring, the lens holder is connected with the magnet part by the spring so as to move relatively to the optical axis direction, the lens holder comprises a first coil arranged around an outer circumference of a lens, the magnet part comprises a first magnet part including a first face facing to the first coil and a second magnet part including a second face vertical to the first face and constituting a magnetic domain different from that of the first magnet part, the first magnet part and the second magnet part are integrated, and the base part comprises a second coil facing to the second face.

The magnet part of the lens holding device according to the first aspect of the present invention has a first face and a second face which are vertical each other, and a first coil and a second coil are arranged so as to face to the first face and the second face, respectively. Therefore, the lens holding device can be downsized in the radial direction of the lens and this is advantageous in miniaturization. Also, the first magnet part and the second magnet part are integrated, but each of them has a different magnetic domain. Therefore, a strong magnetic field can be formed around the first coil and the second coil even with easy assembling.

Also, for example, at least one of the first magnet part and the second magnet part may be continuous in a circumferential direction of the lens.

The magnet part whose at least one of the first magnet part and the second magnet part is continuous in the circumferential direction is easily assembled because the magnet part is entirely integrated. If the first magnet part is continuous in the circumferential direction, it is possible to prevent a magnetic field which interlinkages the first coil in the opposite direction to the direction where a driving force is generated, so that the driving force is enhanced when an electric current flows through the first coil.

The magnet part may have an alignment part which positions the spring.

The alignment part for positioning the spring is formed at the magnet part, which allows the spring to be positioned directly in respect to the magnet. Therefore, it is possible for the lens holding device to precisely assemble the lens holding unit including the spring.

Also, for example, the lens holding device according to the present invention may comprise a plurality of the springs including;

an incident side spring which is arranged at an incident side of the lens with respect to the first coil and an outgoing side spring which is arranged at an outgoing side of the lens with respect to the first coil, wherein the magnet part may have a plurality of the alignment parts including an incident side alignment part which positions the incident side spring and an outgoing side alignment part which positions the outgoing side spring.

The magnet part has the incident side alignment part which positions the incident side spring and the outgoing side alignment part which positions the outgoing side spring. Accordingly, it can effectively prevent an error of relative arrangement between the incident side spring and the outgoing side spring from occurring and reduce problems that the lens holder and the lens incline or move slantly.

Also, for example, a distance along the optical axis direction between the incident side alignment part and the outgoing side alignment part may be approximately as long as a length of the lens holder along the optical axis direction.

Also, for example, the second face of the second magnet part may have a second face convex part and a second face concave part caved in the optical axis direction from the second face convex part so as to be apart from the second coil and at least a part of the alignment part may be provided on the second face concave part.

By approximately equalizing the distance along the optical axis direction between the incident side alignment part and the outgoing side alignment part with a length of the lens holder along the optical axis direction, it is possible to simplify the shapes of the incident and outgoing side springs and support the lens holder with good balance. Further, the length of the magnet part in the optical axis direction can be shortened by forming the alignment part on the second face concave part caved in the optical axis direction, which contributes to low profiling of the lens holding device.

Also, the lens holding device according to the second aspect of the present invention comprises;

a base part and a lens holding unit held so as to move relatively with respect to the base part to a direction vertical to an optical axis direction; wherein the lens holding unit comprises a lens holder, a magnet part, and a spring, the lens holder is connected with the magnet part by the spring so as to move relatively to the optical axis direction, the lens holder comprises a first coil arranged around an outer circumference of a lens, the magnet part comprises a first magnet part including a first face facing to the first coil and a second magnet part including a second face vertical to the first face and constituting a magnetic domain different from that of the first magnet part, the second magnet part is continuous in a circumferential direction of the lens, and the base part comprises a second coil facing to the second face.

As similar to the lens holding device according to the first aspect of the present invention, the magnet part of the lens holding device according to the second aspect of the present invention can downsize the device in the radial direction of the lens and this is advantageous in miniaturization. Also, the number of components is small and the assembling is easy because the second magnet is continuous in the circumferential direction.

Also, for example, the first magnet part and the second magnet part may include a resin.

The magnet part constituted by the first magnet part and the second magnet part has high flexibility in forming compared with conventional magnets constituted by only magnetic materials such as metals or ferrites. The alignment part for the spring can be easily formed on the magnet part of the present invention.

Also, for example, the second magnet part may have a second end part located at an end part of the magnet part in the optical axis direction and a second intermediate part located at between the second end part and the first magnet part and constituting a magnetic domain different from those of the second end part and the first magnet part.

The second magnet part has the second intermediate part and the second end part, which can form a strong magnetic field around the second coil and enhance a driving force when an electric current flows through the second coil.

DESCRIPTION OF THE PREFERRED EMBODIMENTS

Figure 1:
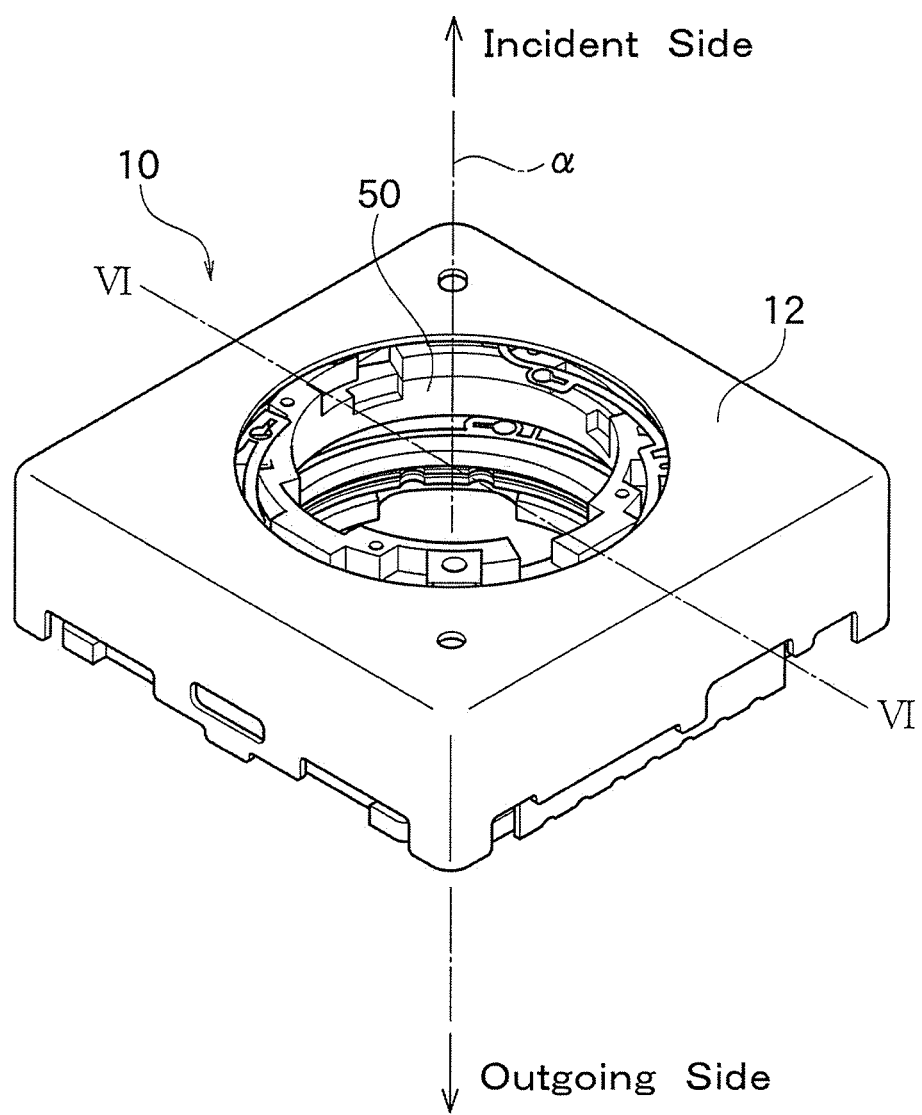
FIG. 1 is a perspective view of the lens holding device according to one embodiment of the present invention.

FIG. 1 is a perspective view of the lens holding device 10 according to one embodiment of the present invention. The lens holding device 10 has an outer shape of an approximately rectangular parallelpiped shape. A lens holder 50 holding a lens which is omitted in the figure is arranged at a central part of the lens holding device 10. A case 12 is arranged around the outer peripheral side of the lens holder 50.

Figure 6:
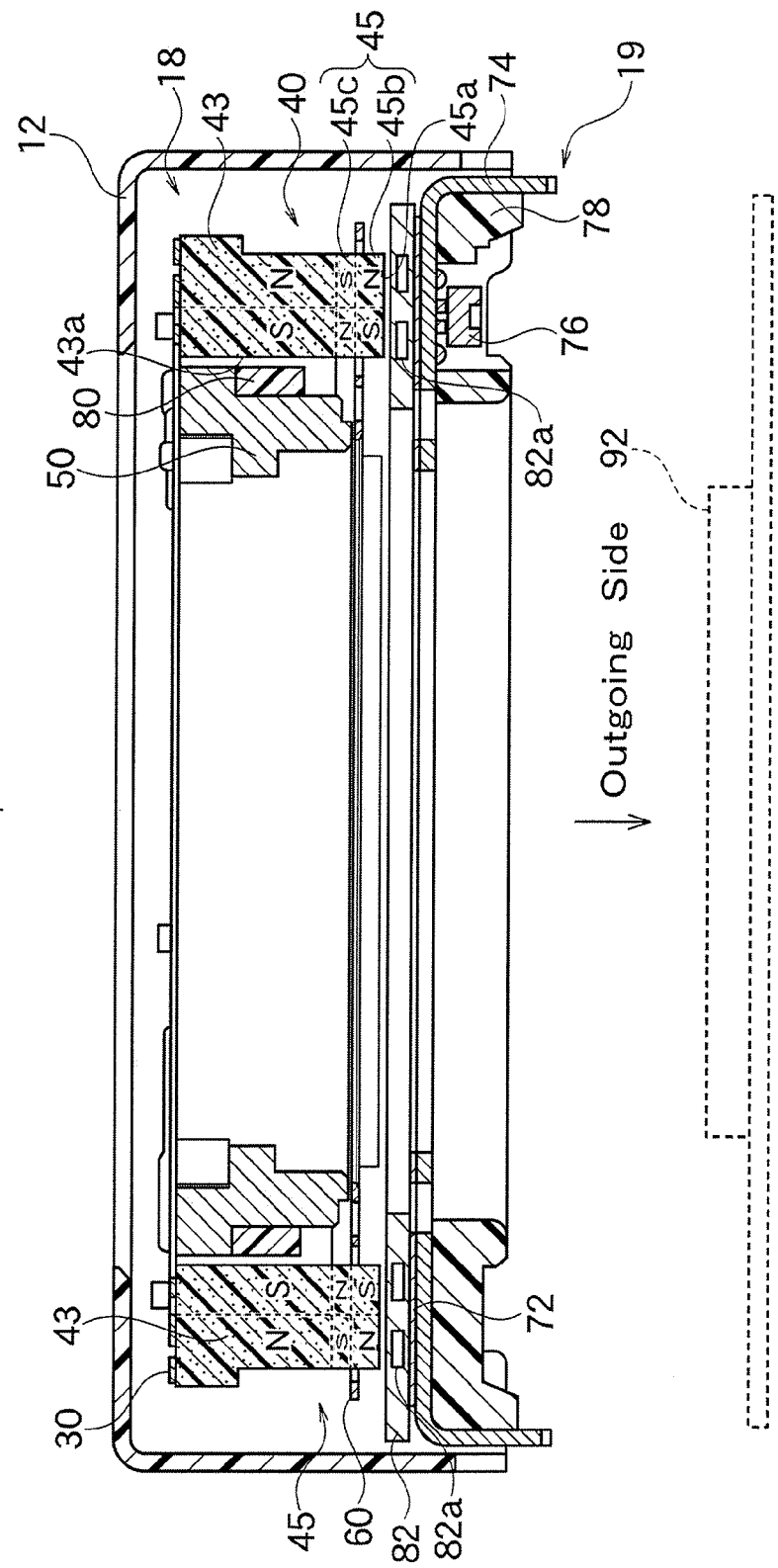
FIG. 6 is a cross section along VI-VI line of the lens holding device shown in FIG. 1.

As shown in the cross section of FIG. 6, the lens holding device 10 is used as a camera module etc. having a focus system and a blur compensation system by combining it with the imaging element 92 which is arranged at the outgoing side, but the purpose of use of the lens holding device 10 is not limited thereto. Note that, for explaining the lens holding device 10, along an optical axis α of the lens, the side where an imaging light enters into the lens is defined as an incident side and the side where the entered imaging light goes out is defined as an outgoing side.

Figure 2:
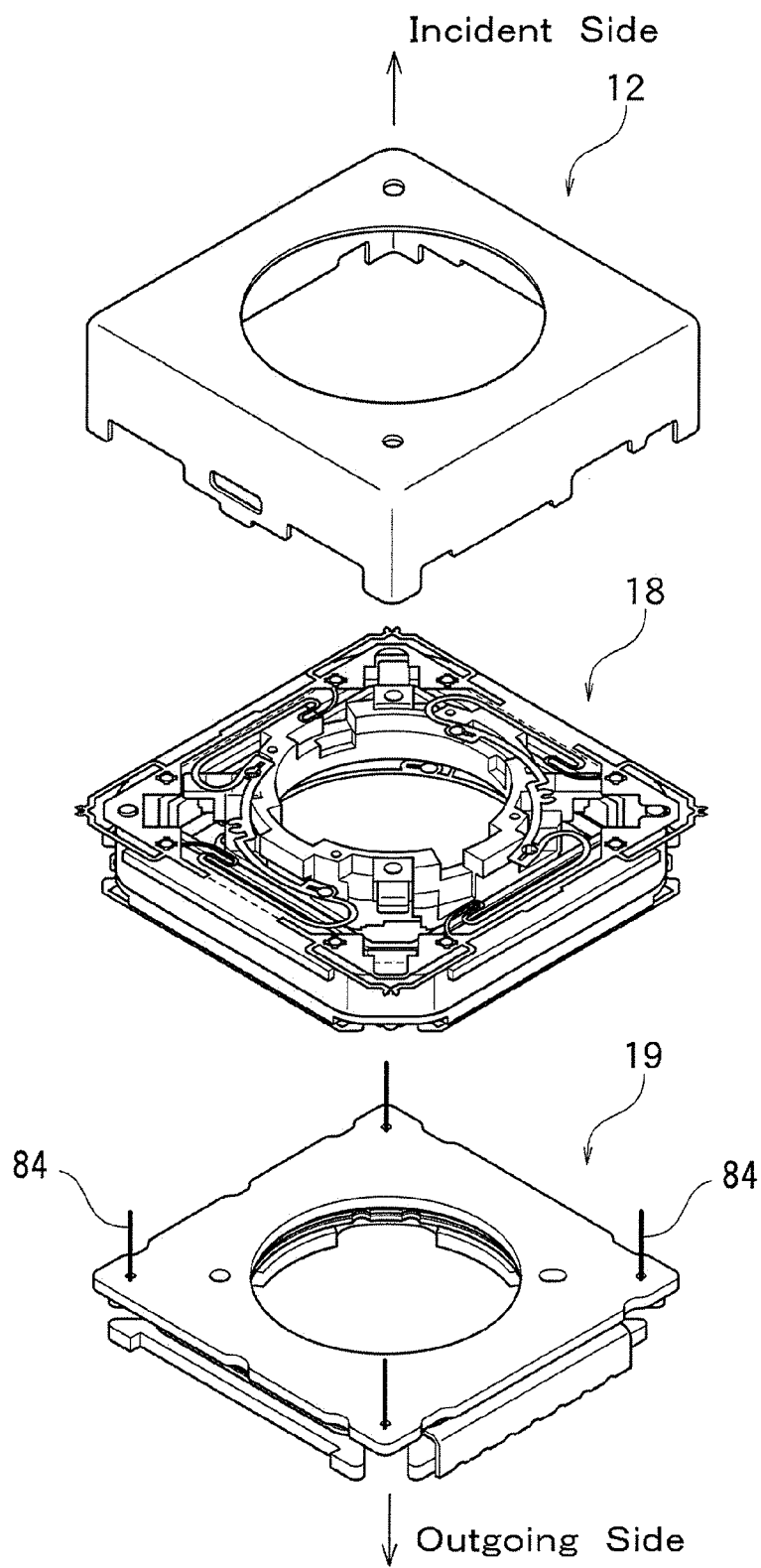
FIG. 2 is a schematic exploded perspective view of the lens holding device shown in FIG. 1.

FIG. 2 is a schematic exploded perspective view of the lens holding device 10 shown in FIG. 1. The lens holding device 10 comprises a case 12, a lens holding unit 18, and a base part 19. The case 12 is attached to a bottom 78 of the base part 19 in a state where the lens holding unit 18 is held between the case 12 and the base part 19 in the optical axis direction (refer to FIG. 1 and FIG. 6).

Figure 3:
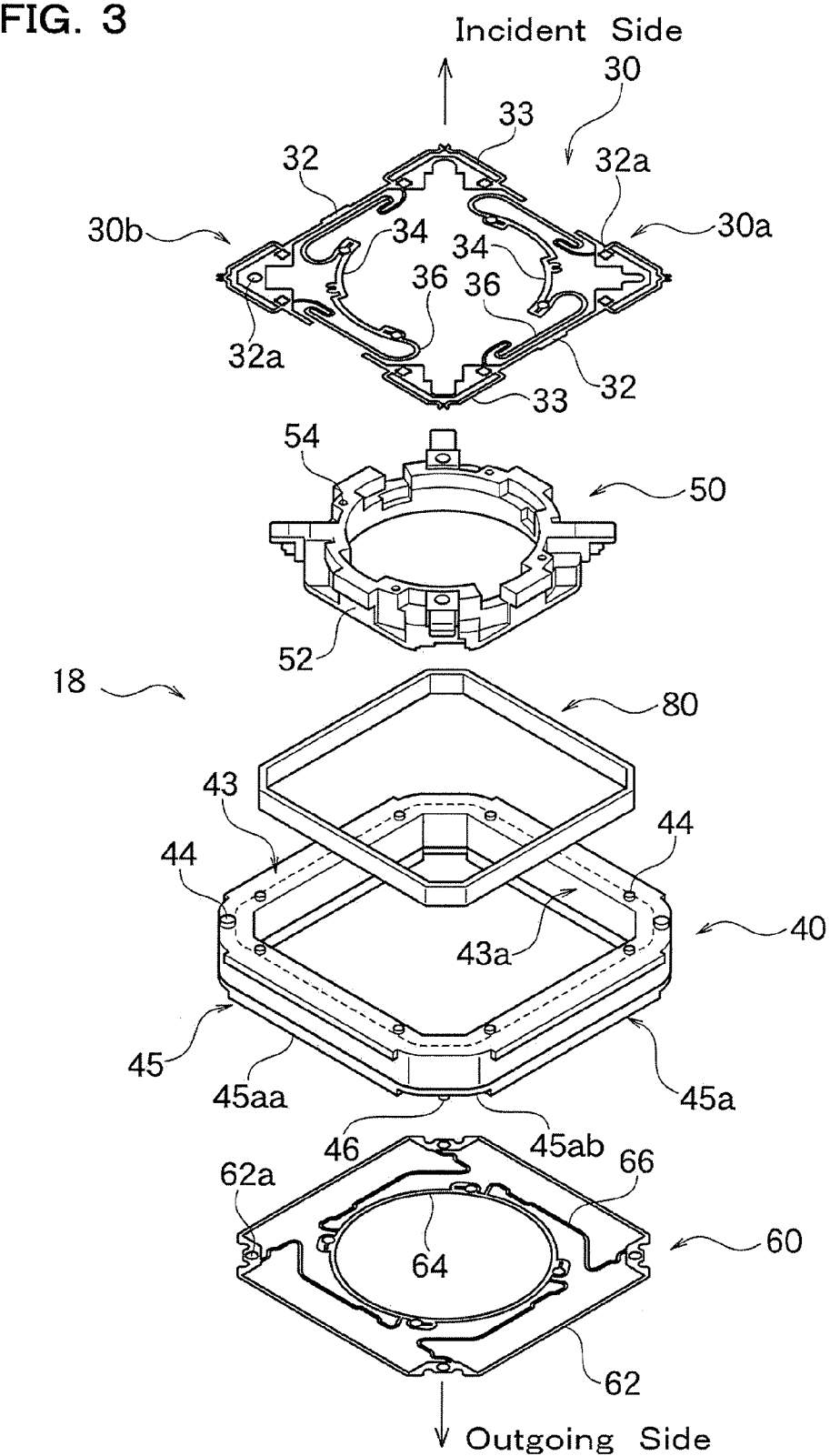
FIG. 3 is a detailed exploded perspective view of the lens holding unit included in the lens holding device.

FIG. 3 is a detailed exploded perspective view of the lens holding unit 18. The lens holding unit 18 comprises the lens holder 50 provided with a first coil 80 which is arranged at the outer circumference of the lens, a magnet part 40, an incident side spring 30, and an outgoing side spring 60. The incident side spring 30 and the outgoing side spring 60 connect the lens holder 50 with the magnet part 40 so that a relative movement can be made in the optical axis direction.

The lens holding unit 18 comprises two springs 30 and 60 constituted by the incident side spring 30 placed at the incident side with respect to the first coil 80 and the outgoing side spring 60 placed at the outgoing side with respect to the first coil 80. The incident side spring 30 resiliently connects the magnet part 40 with the lens holder 50.

The incident side spring 30 is constituted by an incident side spring division 30a and an incident side spring division 30b. The incident side spring division 30a and the incident side spring division 30b are two members which are separated and insulated against each other. They also function as the wiring for supplying the electric power to the first coil 80.

The incident side spring division 30a and the incident side spring division 30b, which constitute the incident side spring 30, have an outer ring part 32, wire holding parts 33, an inner ring part 34, and arm parts 36, respectively. The incident side spring 30 has a multi-ring shape.

The outer ring part 32 constituting an outer circumference part of the incident side spring 30 is fixed to an incident side end face of the magnet part 40 by adhesion or heat caulking or so. Incident side alignment parts 44 positioning the incident side spring 30 are formed at the incident side end face of the magnet 40.

The incident side alignment parts 44 are convex portions projecting to the optical axis α direction from a first magnet part 43 of the magnet part 40 and the incident side alignment parts 44, which are convex portions, are engaged with through holes 32a formed at the outer ring part 32 of the incident side spring 30, so that the incident side spring 30 is positioned with respect to the magnet part 40. The wire holding parts 33, where incident side end parts of suspension wires 84 (refer to FIG. 2 and FIG. 4) are fixed, are connected to the four corners of the outer ring part 32.

The inner ring part 34 comprising an inner peripheral part of the incident side spring 30 is fixed to an incident side inner ring arrangement part 54 of the lens holder 50 by adhesion or so. The outer ring part 32 and the inner ring part 34 are connected by the arm parts 36.

The incident side spring 30 is formed by a resilient material of metal or so, and the arm parts 36 can resiliently change its shape. By the arm parts 36 changing its shape resiliently, the inner ring part 34 can make a relative movement towards the optical axis α direction with respect to the outer ring part 32.

Note that, when the incident side spring 30 serves as an electricity supplying route to the first coil 80, in order to ensure insulation between the outer ring 32 of the incident side spring 30 and the magnet part 40, an insulation coating or so may be applied on the surface of the incident side spring 30 or the magnet part 40. Further, an insulation sheet or so may be inserted in between the incident side spring 30 and the magnet part 40 as well.

The magnet part 40 is arranged at the outer circumference side of the lens holder 50 and the first coil 80, and has the first magnet part 43 including a first face 43a facing to the first coil 80 and a second magnet part 45 including a second face 45a vertical to the first face 43a and facing toward the outgoing side. The magnet part 40 is a plastic magnet including resins and magnetic materials such as ferrite or metals, and can be transformed to a comparatively free shape as with an ordinary plastic. Specific materials and a production method or so of the magnet part 40 are not particularly limited, but the magnet part 40 is preferably an anisotropy magnet whose easy-magnetization axes in the magnetic materials contained in the magnet part 40 are aligned.

Ferrite bonded magnets, rare earth bonded magnets and so on, which are molded by kneading magnetic powder to resin, are exemplified as plastic magnets. In order to produce anisotropic magnets constituted by plastic magnets, easy-magnetization axes are preferably aligned by orientating particles of magnetic powder in resin to a predetermined direction during molding. The method for orientating magnetic powder in resin to a predetermined direction during molding is not particularly limited, but, for example, there is a method for performing injection-molding solidifying by applying pressure to inside of a cavity of a mold with proper pressure and temperature, while impressing magnetic powder (ferrite or metal powder) in resin with an orienting magnetic field.

The first magnet part 43 and the second magnet part 45 are integrally connected. Also, the magnet part 40 constituted by the first magnet part 43 and the second magnet part 45 have a frame shape which is continuous in the circumferential direction of the lens.

As shown in FIG. 6, which is a cross section, the direction of magnetization of the first magnet part 43 and the second magnet part 45 of the magnet part 40 is vertical to the optical axis direction. Also, the first magnet part 43 and the second magnet part 45 constitute magnetic domains each other.

Further, the second magnet part 45 has a second end part 45b located at the outgoing side end part of the optical axis direction of the magnet part 40 and a second intermediate part 45c located in between the second end part 45b and the first magnet part 43. The second intermediate part 45c constitutes magnetic domains different from those of the first magnet part 43 and the second end part 45b. Therefore, in regard to the direction of magnetization of the magnet part 40, the first magnet part 43 and the second intermediate part 45c are opposite and the second intermediate part 45c and the second end part 45b are opposite.

As shown in FIG. 3, the lens holder 50 has a cylindrical shape which is hollow and bottomless, and the lens (not shown in the figure) is fixed at the inner peripheral face of the lens holder 50. The lens holder 50 is provided with the incident side inner ring arrangement part 54 where the inner ring part 34 of the incident side spring 30 is fixed and an outgoing side inner ring arrangement part 56 (refer to FIG. 5) where an inner ring part 64 of the outgoing side spring 60 is fixed.

As shown in FIG. 3, the first coil 80 is fixed to a coil arrangement part 52 formed at the outer circumference part of the lens holder 50 and arranged so that a wire constituting the first coil 80 is wound on the outer circumference of the lens holder 50 to keep distant from the first face 43a which is an inner periphery face of the magnet 40.

Both ends of the wire constituting the first coil 80 are electrically connected respectively to the incident side spring division 30a and the incident side spring division 30b, which constitute the incident side spring 30. Via the incident side spring 30, the electric power is supplied to the first coil 80 to move the lens holder 50 along the optical axis α direction relatively to the magnet part 40.

As with the incident side spring 30, the outgoing side spring 60 resiliently connects the magnet part 40 and the lens holder 50. The outgoing side spring 60 has a multi-ring shape consisting of the outer ring part 62, the inner ring part 64 and the arm parts 66.

Figure 5:
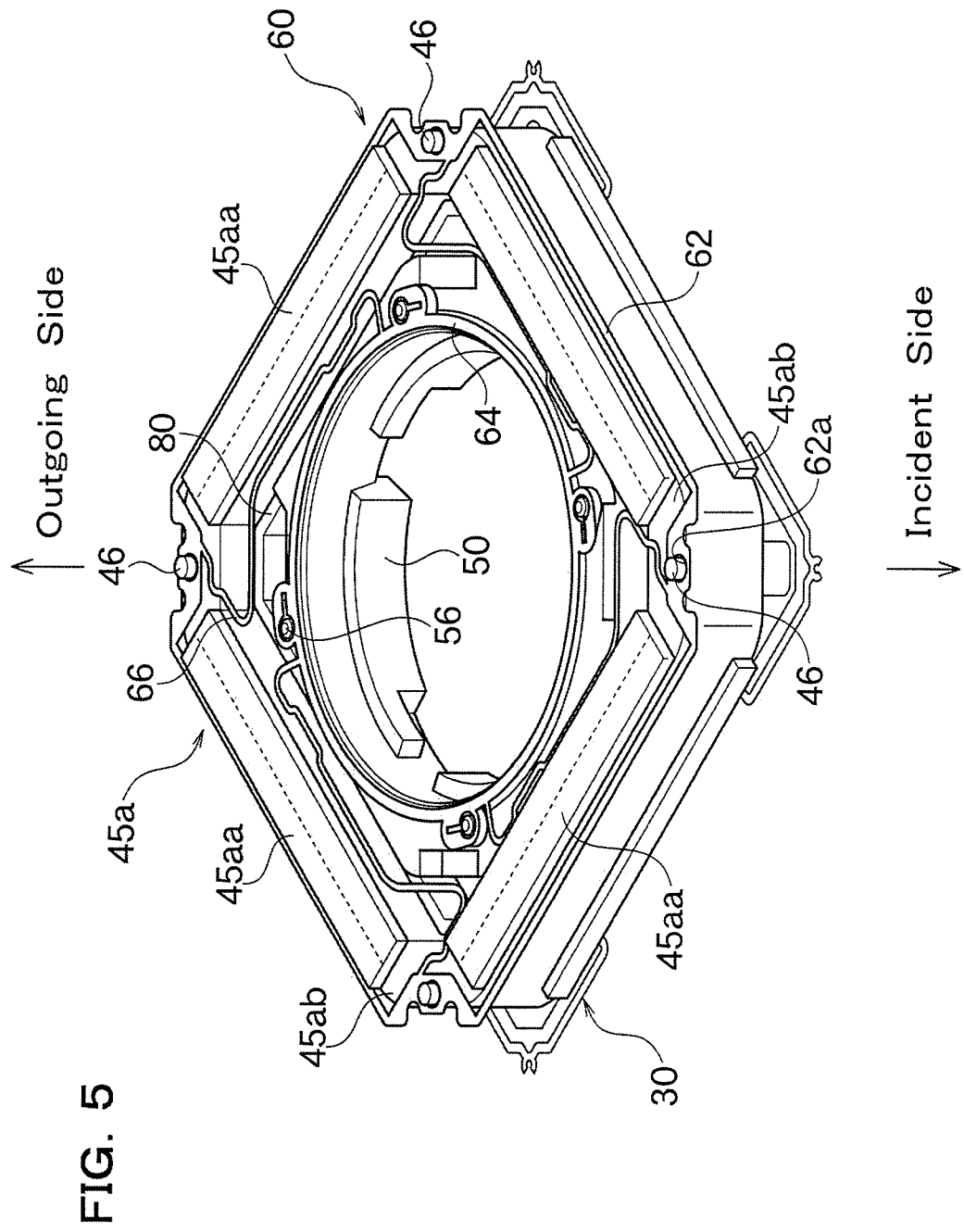
FIG. 5 is a perspective view of the lens holding unit shown in FIG. 1, viewed from the incident side of the lens.

As shown in FIG. 3, the outer ring part 62 constituting the outer circumference part of the outgoing side spring 60 is fixed to the second face 45a which is an outgoing side end face of the magnet part 40. As shown in FIG. 5, the second face 45a has a second face convex part 45aa located at the nearest to the incident side at the magnet part 40 and a second face concave part 45ab caved from the second face convex part 45aa in the optical axis direction so as to be apart from the second coils 82a.

The second face concave parts 45ab are provided with outgoing side alignment parts 46 respectively, which are convex for alignment of the outgoing side spring 60, and the outgoing side spring 60 is positioned with respect to the magnet part 40 by engaging the outgoing side alignment parts 46 with through holes 62a formed at the outer ring part 62. The outer ring part 62 of the outgoing side spring 60 may be fixed to the magnet 40 by adhesion or so. Further, if the outgoing side alignment parts 46 are convex, the outer ring part 62 may be fixed to the magnet part 40 by caulking the outgoing side alignment parts 46.

The inner ring part 64 of the outgoing side spring 60 is fixed to the outgoing side inner ring arrangement part 56 (refer to FIG. 5) of the lens holder 50 by adhesion or so. The outer ring part 62 and the inner ring part 64 of the outgoing side spring 60 are connected by the arm parts 66.

As with the incident side spring 30, the outgoing side spring 60 is constituted by the resilient material such as metal, and the arm parts 66 can resiliently change its shape. As with the incident side spring 30, by changing the shape of the arm parts 36 resiliently, the inner ring part 64 of the outgoing side spring 60 can make a relative movement along the optical axis α direction with respect to the outer ring part 62.

Figure 4:
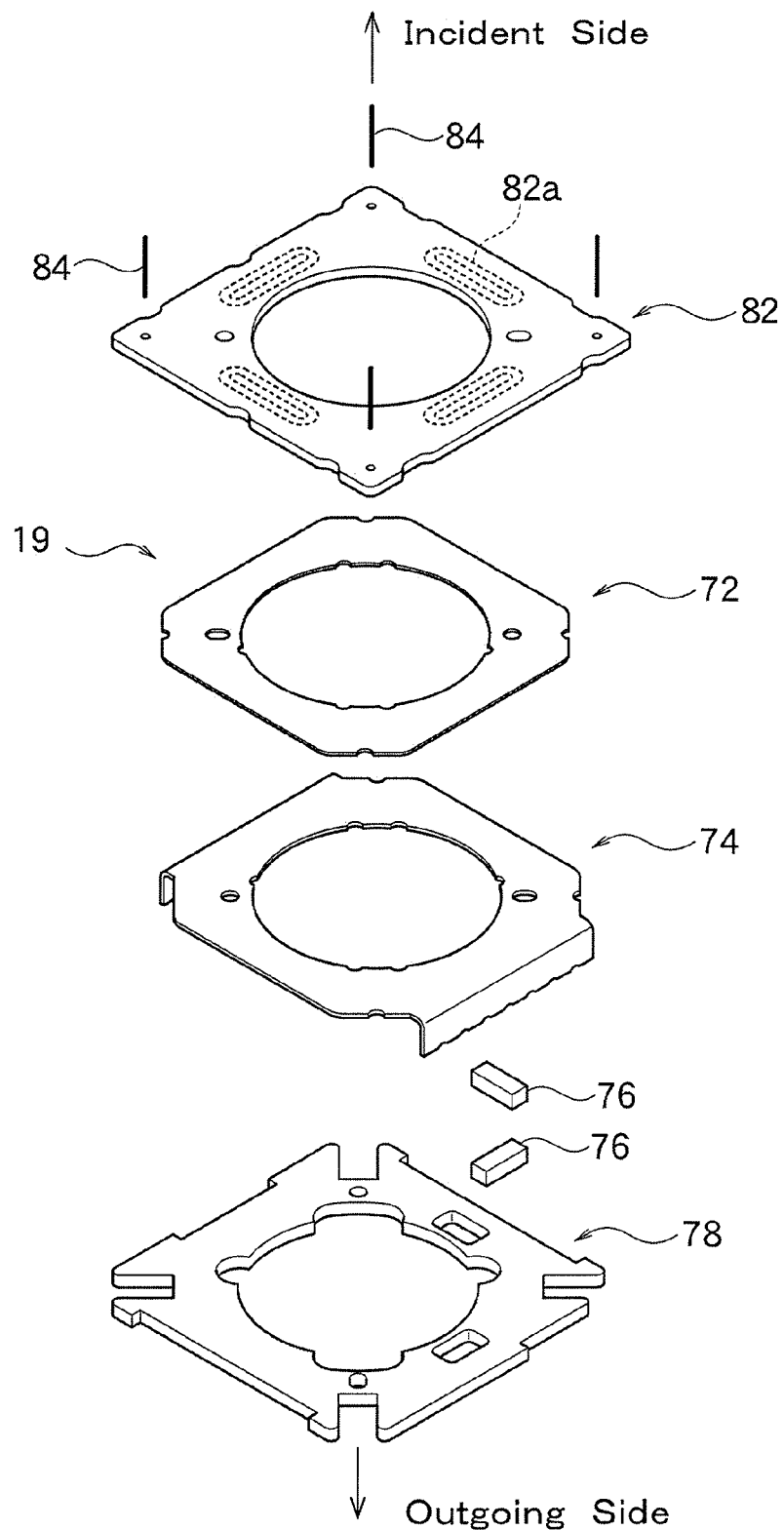
FIG. 4 is a detailed exploded perspective view of the base part included in the lens holding device.

FIG. 4 is a detailed exploded perspective view of the base part 19 shown in FIG. 2. The base part 19 comprises suspension wires 84, an FP coil 82, a sheet member 72, an FPC 74, hall effect sensors 76, and a bottom 78. The suspension wires 84 connect the lens holding unit 18 shown in FIG. 2 with the base part 19 so as to move the unit 18 in the direction vertical to the optical axis direction with respect to the base part 19.

As shown in FIG. 4, the outgoing side ends of the suspension wires 84 are connected to four corners of the FP coil 82. The suspension wires 84 can be produced by metal material such as phosphor bronze, but the material of the suspension wires 84 is not particularly limited.

At least two out of the four suspension wires 84 are conductive and the first coil 80 can be supplied with electricity via the incident side spring 30 shown in FIG. 3. The suspension wires 84 used as the electricity supplying route are electrically connected to the FPC 74 shown in FIG. 4.

At the incident side surface of the bottom 78, three sheet-shaped members consisted by the FP coil 82 (flexible printed coil), the sheet member 72, and the FPC 74 (flexible printed substrate) are arranged by being piled in the optical axis direction. The FP coil 82 is arranged at the top face (incident side) of the above-mentioned three members and, as shown in FIG. 6, arranged to face to the second face 45a of the magnet part 40 with a clearance. The FP coil 82 has the four second coils 82a covered by a base film and the four second coils 82a are arranged along the circumferential direction of the FP coil 82 so that they face to the four second face convex parts 45aa shown in FIG. 5.

The FPC 74 is fixed to the incident side surface of the bottom 78 and the FP coil 82 is fixed to the incident side surface of the FPC 74 via the sheet member 72. The sheet member 72 is provided in order to prevent electric noise from occurring in between the FPC 74 and the FP coil 82. An electric circuit for controlling electric current values of the first coil 80 and the second coils 82a and the like is formed on the FPC 74. An outer terminal is formed at an end part of the FPC 74 for performing transmission and reception of signals with an external controlling circuit and for supply of electricity.

The bottom 78 plays a role of providing the base part 19 with rigidity for supporting the lens holding unit 18 shown in FIG. 2 and is formed by a resin or so. As shown in FIG. 6, the hall effect sensors 76 as a movement detection part for detecting the movement of the lens holding unit 18 in the direction vertical to the optical axis direction are arranged at the outgoing side surface of the bottom 78.

The base part 19 has the two hall effect sensors 76 for detecting the positions of the two directions vertical to the optical axis and each of the hall effect sensors 76 is arranged at a position corresponding to the second face convex part 45aa at the outgoing side thereof so that variations of a magnetic field formed by the second magnet part 45 can be preferably detected. Note that, the hall effect sensors 76 are preferably arranged at positions where they do not overlap with the second coils 82a from a view of the optical axis direction. As shown in FIG. 4, holes for passing light emitted from the lens are formed at the center parts of the FP coils 82, the sheet member 72, the FPC 74, and the bottom 78 which are included in the base part 19.

As shown in FIG. 6, the first coil 80 fixed to the lens holder 50 faces to the first face 43a of the first magnet part 43 with a clearance and a voice coil motor which performs a focusing movement is constituted by the first coil 80 and the first magnet part 43. That is, by flowing an electric current through the first coil 80, an interaction between the first coil 80 and the first magnet part 43 can move the lens holder 50 in the optical axis direction parallel to the direction which the first face 43a extends.

The second coils 82a included in the FP coil 82 which is a part of the base part 19 faces to the second face 45a of the second magnet part 45 and the voice coil motor which performs a blur compensation movement is constituted by the second coil 82a and the second magnet part 45. That is, by flowing an electric current through the second coil 82a, an interaction between the second coil 82a and the second magnet part 45 can move the entire lens holder unit 18 (refer to FIG. 2) to the direction which is vertical to the optical axis direction and is parallel to the direction in which the second face 45a extends. In this case, by detecting variations of a magnetic field mainly formed by the second magnet part 45, the hall effect sensors 76 set on the base part 19 detect a position related to the direction vertical to the optical axis direction of the lens holding unit 18.

In the lens holding device 10, the magnet part 40 has the first face 43a and the second face 45a which are vertical to each other and the first coil 80 and the second coils 82a are arranged to face to the first face 43a and the second face 45a, respectively. Therefore, the lens holding device 10 can be downsized in the radial direction of the lens and this is advantageous in miniaturization.

Also, the first magnet part 43 and the second magnet part 45 are integrated. However, they have magnetic domains different from each other. Therefore, strong magnetic fields can be formed around the first coil 80 and the second coil 82a even with easy assembling. From this, it is possible to enhance driving forces of the voice coil motors which perform focusing movements and blur compensation movements.

Also, the first magnet part 43 and the second magnet part 45 are connected in the optical axis direction in the magnet part 40 and the magnet part 40 has an integrated shape which is continuous in the circumferential direction. Therefore, it is possible to perform assembling easily and prevent a magnetic field which interlinkages the first coil in the direction opposite to the direction where a driving force generates.

Also, the magnet part 40 has a plurality of alignment parts 44 and 46 including the incident side alignment parts 44 and the outgoing side alignment parts 46, which allows the incident side spring 30 and the outgoing side spring 60 to be aligned with respect to the same magnet part 40. From this, the lens holding device 10 can heighten concentricity between the incident side spring 30 and the outgoing side spring 60 and problems that the lens holder 50 and the lens incline or move slantly can be reduced.

Further, the lens holder 50 and the lens can be precisely positioned. Therefore, a tilt adjusting step or so of the lens can be omitted or simplified and the lens holding device 10 is easily assembled. In addition, it is preferable for the magnet part 40 to be molded integrally by injection molding or so from the aspect of heightening of concentricity of the springs 30 and 60.

Also, as shown in FIG. 5, the lens holding device 10 is advantageous in low profiling because the length of the entire lens holding device 10 in the optical axis direction can be shortened by the fact that the second face 45a has the second face concave part 45ab and that the outer ring part 62 of the outgoing side spring 60 is fixed to the second face concave part 45ab.

Other Embodiment

Figure 7:
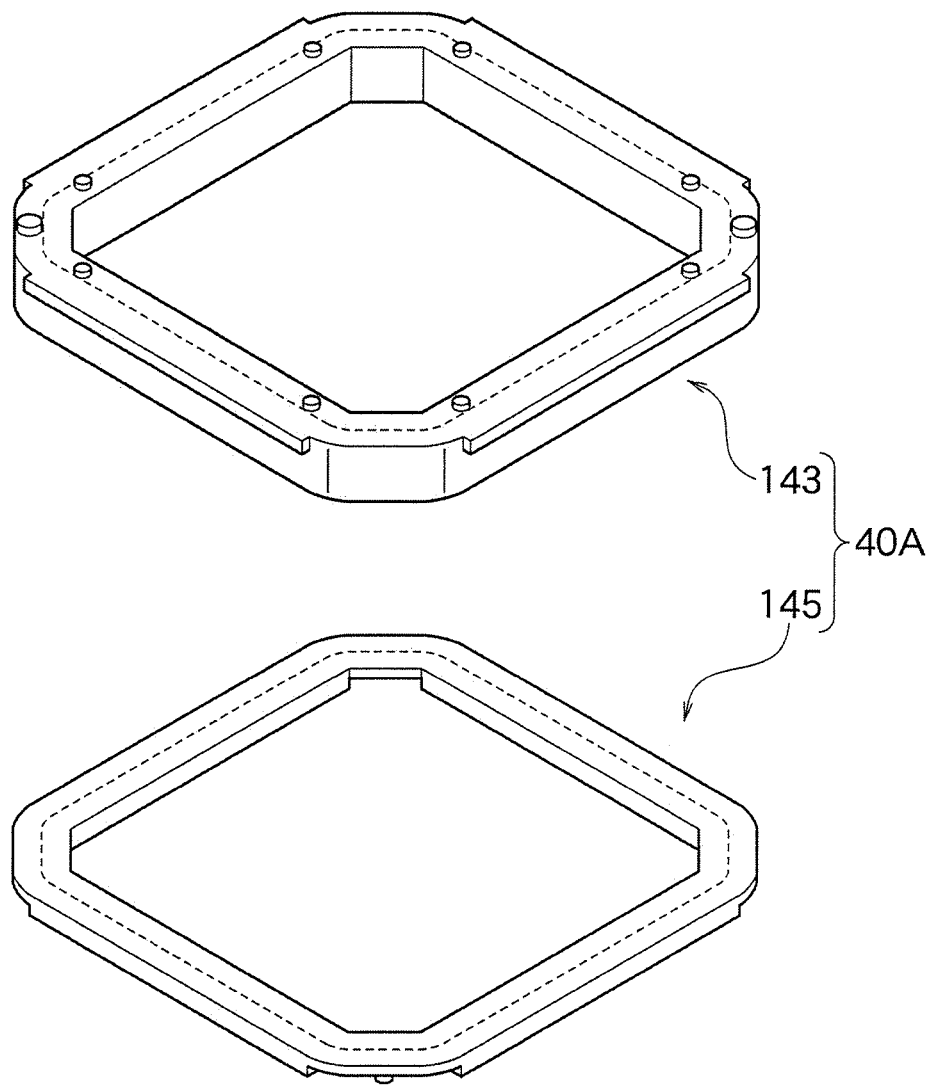
FIG. 7 is a perspective view which represents another variation of the magnet part.

The shapes or so of the magnet part 40 and the springs 30 and 60 included in the lens holding device 10 may be properly adjusted according to a demand for the lens holding device 10. Further, as shown in FIG. 7, a magnet 40A included in the lens holding device 10 may be comprised of the first magnet part 143 and the second magnet part 145, which are separately molded, have frame shapes and integrated by adhesion or so.

Further, the second magnet part 45 shown in FIG. 6 is not limited to one having the second intermediate part 45c and the second end part 45b whose directions of magnetization are opposite to each other. The second magnet part 45 is not particularly limited as far as the magnetic domains thereof are different from that of the first magnet part 43.

Further, the method for attaching the magnet part and the springs 30 and 60 is not limited to adhesion or caulking. The spring 60 may be attached to the magnet part by forming the magnet part by positioning the incident side spring 30 and/or the outgoing side spring 60 in a mold and performing injection molding to form the magnet part. Even in this case, the springs 30 and 60 are precisely aligned and fixed to the magnet.

Further, the supporting structure of the lens holding unit 18 in the base part 19 is not limited to the structure using a suspension wire, either. Other structures such as one having a slide face which slides in X-direction and Y-direction vertical to the optical axis may be adopted.

NUMERICAL REFERENCES

10 . . . lens holding device
18 . . . lens holding unit
19 . . . base part
30 . . . incident side spring
60 . . . outgoing side spring
30a . . . incident side spring division
30b . . . incident side spring division
40 . . . magnet part
43 . . . first magnet part
43a . . . first face
44 . . . incident side alignment part
45 . . . second magnet part
45a . . . second face
45aa . . . second face convex part
45ab . . . second face concave part
45b . . . second end part
45c . . . second intermediate part
46 . . . outgoing side alignment part
50 . . . lens holder
80 . . . first coil
82a . . . second coil

The invention claimed is:

1. A lens holding device comprising:
a base part, and
a lens holding unit held so as to move relatively with respect to the base part in a vertical direction parallel to an optical axis direction,
wherein:
the lens holding unit comprises a lens holder, a magnet part consisting solely of plastic magnet, and a spring,
the lens holder is connected with the magnet part by the spring so as to move relative to the optical axis direction,
the lens holder comprises a first coil arranged around an outer circumference of a lens and having an axis corresponding with the optical axis direction,
the magnet part includes: a first magnet part including a first face facing the first coil and constituting a first magnetic domain, and a second magnet part including a second face being vertically disposed relative to the first face and constituting a second magnetic domain different from the first magnetic domain of the first magnet part,
the first magnet part and the second magnet part are integrated, the second magnet part being a continuous ring in a circumferential direction of the lens,
the base part of the lens holding device comprises a second coil facing the second face,
the spring of the lens holding unit comprises an incident side spring which is arranged at an incident side of the lens with respect to the first coil and an outgoing side spring which is arranged at an outgoing side of the lens with respect to the first coil,
the lens holding unit further comprises a plurality of alignment parts including an incident side alignment part which is arranged at the first magnet part and positions the incident side spring, and an outgoing side alignment part which is arranged at the second magnet part and positions the outgoing side spring, and
the second magnet part further comprises a second intermediate part having a third magnetic domain.

2. The lens holding device as set forth in claim 1, wherein at least one of the first magnet part and the second magnet part is continuous in a circumferential direction of the lens.

3. The lens holding device as set forth in claim 1, wherein a distance along the optical axis direction between the incident side alignment part and the outgoing side alignment part is substantially as long as a length of the lens holder along the optical axis direction.

4. The lens holding device as set forth in claim 1, wherein the second face of the second magnet part comprises a second face convex part and a second face concave part caved in the optical axis direction from the second face convex part so as to be apart from the second coil, and at least a part of the alignment part is provided on the second face concave part.

5. The lens holding device as set forth in claim 1, wherein both of the first magnet part and the second magnet part include a resin.

6. The lens holding device as set forth in claim 1, wherein the second magnet part comprises a second end part located at an end part of the magnet part in the optical axis direction and the second intermediate part located at between the second end part and the first magnet part and constituting the third magnetic domain different from those of the second end part and the first magnet part.

7. The lens holding device as set forth in claim 1, wherein the plurality of alignment parts is integrally connected to the magnet part.

8. A lens holding device comprising:
a base part, and
a lens holding unit held so as to move relatively with respect to the base part in a vertical direction parallel to an optical axis direction,
wherein:
the lens holding unit comprises a lens holder, a magnet part consisting solely of plastic magnet, and a spring,
the lens holder is connected with the magnet part by the spring so as to move relative to the optical axis direction,
the lens holder comprises a first coil arranged around an outer circumference of a lens and having an axis corresponding with the optical axis direction,
the magnet part includes: a first magnet part including a first face facing the first coil and constituting a first magnetic domain, and a second magnet part including a second face being vertically disposed relative to the first face and constituting a second magnetic domain different from the first magnetic domain of the first magnet part, the second magnet part is a continuous ring in a circumferential direction of the lens, the base part of the lens holding device comprises a second coil facing the second face, the spring comprises an incident side spring which is arranged at an incident side of the lens with respect to the first coil and an outgoing side spring which is arranged at an outgoing side of the lens with respect to the first coil, the lens holding unit further comprises a plurality of alignment parts including an incident side alignment part which is arranged at the first magnet part and positions the incident side spring and an outgoing side alignment part which is arranged at the second magnet part and positions the outgoing side spring, and the second magnet part further comprises a second intermediate part having a third magnetic domain.

9. The lens holding device as set forth in claim 8, wherein both of the first magnet part and the second magnet part include a resin.

10. The lens holding device as set forth in claim 8, wherein the second magnet part comprises a second end part located at an end part of the magnet part in the optical axis direction and the second intermediate part located at between the second end part and the first magnet part and constituting the third magnetic domain different from those of the second end part and the first magnet part.

\* \* \* \* \*